United States Patent
Zabel et al.

(10) Patent No.: US 7,386,393 B2
(45) Date of Patent: Jun. 10, 2008

(54) SYSTEM AND METHOD FOR AUTOMATICALLY PROVIDING VEHICLE NAVIGATION INFORMATION

(75) Inventors: Jeff Zabel, Palo Alto, CA (US); Felix Haas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/525,610

(22) Filed: Sep. 21, 2006

(65) Prior Publication Data

US 2008/0077317 A1    Mar. 27, 2008

(51) Int. Cl.
*G01C 21/00* (2006.01)
*G08G 1/123* (2006.01)

(52) U.S. Cl. .................. 701/200; 701/209; 340/995.19

(58) Field of Classification Search ................ 701/200, 701/201, 202, 209; 340/995.19
See application file for complete search history.

(56) References Cited

U.S. PATENT DOCUMENTS

| | | | |
|---|---|---|---|
| 6,708,108 B2 * | 3/2004 | Jones | 701/200 |
| 6,996,468 B2 * | 2/2006 | Kohno et al. | 701/200 |
| 2002/0103583 A1 * | 8/2002 | Ohmura et al. | 701/33 |
| 2004/0210363 A1 * | 10/2004 | Katagishi et al. | 701/33 |
| 2005/0031100 A1 * | 2/2005 | Iggulden et al. | 379/102.03 |
| 2006/0229778 A1 * | 10/2006 | Obradovich et al. | 701/33 |
| 2007/0022173 A1 * | 1/2007 | Tamura et al. | 709/207 |

OTHER PUBLICATIONS

Website article [http://www.dash.net/product.php and http://www.dash.net/how-it-works.php] (Three (3) pages).

* cited by examiner

*Primary Examiner*—Mark Hellner
(74) *Attorney, Agent, or Firm*—Crowell & Moring LLP

(57) ABSTRACT

Users are provided with the option of having destination information, such as a street address and/or destination phone number, obtained from online mapping services, transmitted to their vehicle's navigation system. In certain embodiments, the user may logon to an online vehicle server to provide information necessary to identify their respective vehicle. Once the target vehicle is identified, the destination information may be transmitted to this vehicle by the vehicle server, after which the vehicle's navigation and communication system may be automatically populated with the received destination information.

21 Claims, 3 Drawing Sheets

SYSTEM AND METHOD FOR AUTOMATICALLY PROVIDING VEHICLE NAVIGATION INFORMATION

FIELD OF THE INVENTION

The present invention relates, in general, to vehicle navigation systems and, more particularly, to automatically providing navigational information to vehicles.

BACKGROUND OF THE INVENTION

In-vehicle navigation systems have become nearly ubiquitous in luxury vehicles and are beginning to find their way into the mid-priced vehicle market as well. Such systems incorporate a receiver for a Global Positioning System (GPS), which is a worldwide radio-navigation system formed of 24 orbiting satellites and their corresponding ground stations. Launched and maintained by the U.S. Department of Defense, these satellites send a stream of signals to the earth's surface enabling a GPS receiver to calculate accurate positions within about 10 feet. The vehicle's GPS receiver works in conjunction with mapping data, which is generally stored locally on a CD-ROM, to provide position-specific information to the vehicle operator. Other components of the in-vehicle navigation system include an on-board computer system which can process both speed and direction information received from the vehicle's odometer and on-board compass.

Although position-specific information can be very useful, in-vehicle navigation systems are most widely used for obtaining directions to particular destinations. In short, in-vehicle navigation systems have the ability to provide turn-by-turn directions the vehicle operator when the address of the desired destination is provided to the system. However, one significant drawback is that entering the desired destination information tends to be a tedious and cumbersome process. For example, the human-machine interfaces (HMIs) for many in-vehicle navigation systems involves a turn-knob or touch-screen input device by which address information may be inputted.

Regardless of the HMI design, all in-vehicle navigation systems require the operator to actually know the address of the desired destination. This information is typically found using one of the many online mapping services. While obtaining direction information using online mapping service is typically an easy process, users are still required to either memorize the address to later input it into the in-vehicle navigation system, or to manually print out the driving directions and/or address. In either case, there is currently no convenience approach to first obtaining and then providing destination information to an in-vehicle navigation system from a device other than the vehicle navigation system itself. Accordingly, there is a need in the art for automatically providing navigational information to vehicles.

BRIEF SUMMARY OF THE INVENTION

Systems and methods for automatically providing navigational information to vehicle are disclosed and claimed herein. In one embodiment, a method includes receiving destination information over a network from an online source in response to a user request to automatically send destination information to a vehicle, and receiving user identification information over the network. The method also includes identifying the vehicle based on the user identification information, and sending the destination information to an in-vehicle navigation system of the vehicle.

Other aspects, features, and techniques of the invention will be apparent to one skilled in the relevant art in view of the following detailed description of the invention.

DETAILED DESCRIPTION OF EXEMPLARY EMBODIMENTS

As will be described in more detail below, one aspect of the invention is to provide users with the option of having destination information, obtained from an online mapping service, automatically transmitted to their vehicle's navigation system. In certain embodiments, this enables the user to receive navigation guidance from their vehicle's navigation system without undergoing the cumbersome process of having to program the vehicle's navigation system.

When implemented in software, the elements of the invention are essentially the code segments to perform the necessary tasks. The program or code segments can be stored in a processor readable medium or transmitted by a computer data signal embodied in a carrier wave over a transmission medium or communication link. As discussed herein, a "computer" or "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. In addition, a "communication link" refers to the medium or channel of communication. The communication link may include, but is not limited to, a telephone line, a modem connection, an Internet connection, a digital subscriber line (DSL), an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

Figure 1:
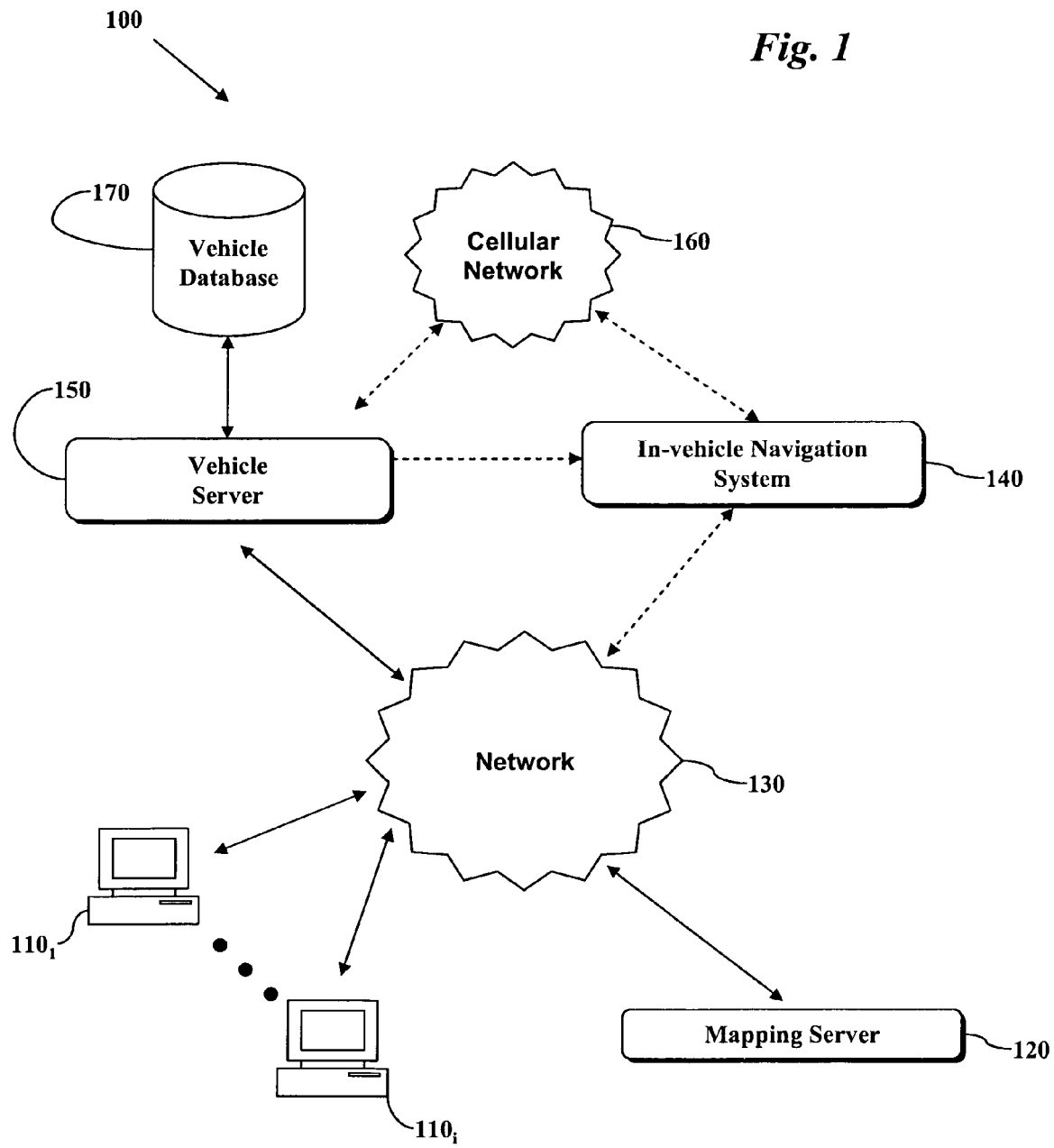
FIG. 1 depicts one embodiment of a simplified system diagram showing the network connectivity between various elements of the invention.

Referring now to the figures, FIG. 1 depicts an exemplary embodiment of a system 100 for carrying out the invention. In this embodiment, a plurality of user computers $110_1$-$110_i$ ("110") are coupled via a communication link with network 130. While network 130 may include any variety of computer network, in a preferred embodiment network 130 is the Internet. As will be described in more detail below with reference to FIG. 2 below, user computers 110 coupled to the network 130 may be used to access a mapping server 120 to obtain a desired street address or directions to a desired destination. Based on a user selection, this destination information may then be passed to a vehicle server 150 via network 130. After the user provides the secure server 150 with user login information, or performs some other authorization procedure, the vehicle server 150 may access user-specific vehicle information from a vehicle database 140. In one embodiment, the vehicle server 150 and vehicle database 170 are operated and maintained by the manufacturer of the user's vehicle. In another embodiment, the vehicle server 150 may be a secure portal to a plurality of vehicle manufacturer's databases. In still another embodiment, the vehicle server 150 may be maintained by a third-party contractor on behalf of a vehicle manufacturer.

It should further be appreciated that the vehicle server 150 may be a secure server in some embodiments. This is due to the fact that, in addition to VIN information, the vehicle server 150 and/or vehicle database 170 may also contain sensitive communication information along with the VIN information. This communication information may be usable to communicate with the vehicle's onboard computer systems and, as such, should not be publicly available. Thus, some sort of authentication process may be required to access the vehicle server 150. If, however, the communication information and/or VIN information is deemed not to be sensitive, then the login process for vehicle server 150 may not be necessary.

Regardless of whether the user is first authenticated, some form of identification information is required in order for the target vehicle to be properly identified. It should be appreciated that this identification information may take virtually any form and should not be limited to a username/password scheme, or the like. In any event, once the identification information is received, the vehicle server 150 may use this information to retrieve information particular to the target vehicle (e.g., VIN) from the vehicle database 170, for example. Additionally, communication information specific to the target vehicle may also be retrieved.

Once the vehicle has been identified and requisite communication information obtained, the vehicle server 150 may then communicate with the appropriate in-vehicle navigation system 160 via the network 130, directly via communication link, or via a separate cellular network 180. Regardless of the form of communication, the vehicle server 150 may provide the aforementioned destination information directly to the in-vehicle navigation system 160, thereby eliminating the need for the user to manually enter such information.

Figure 2:
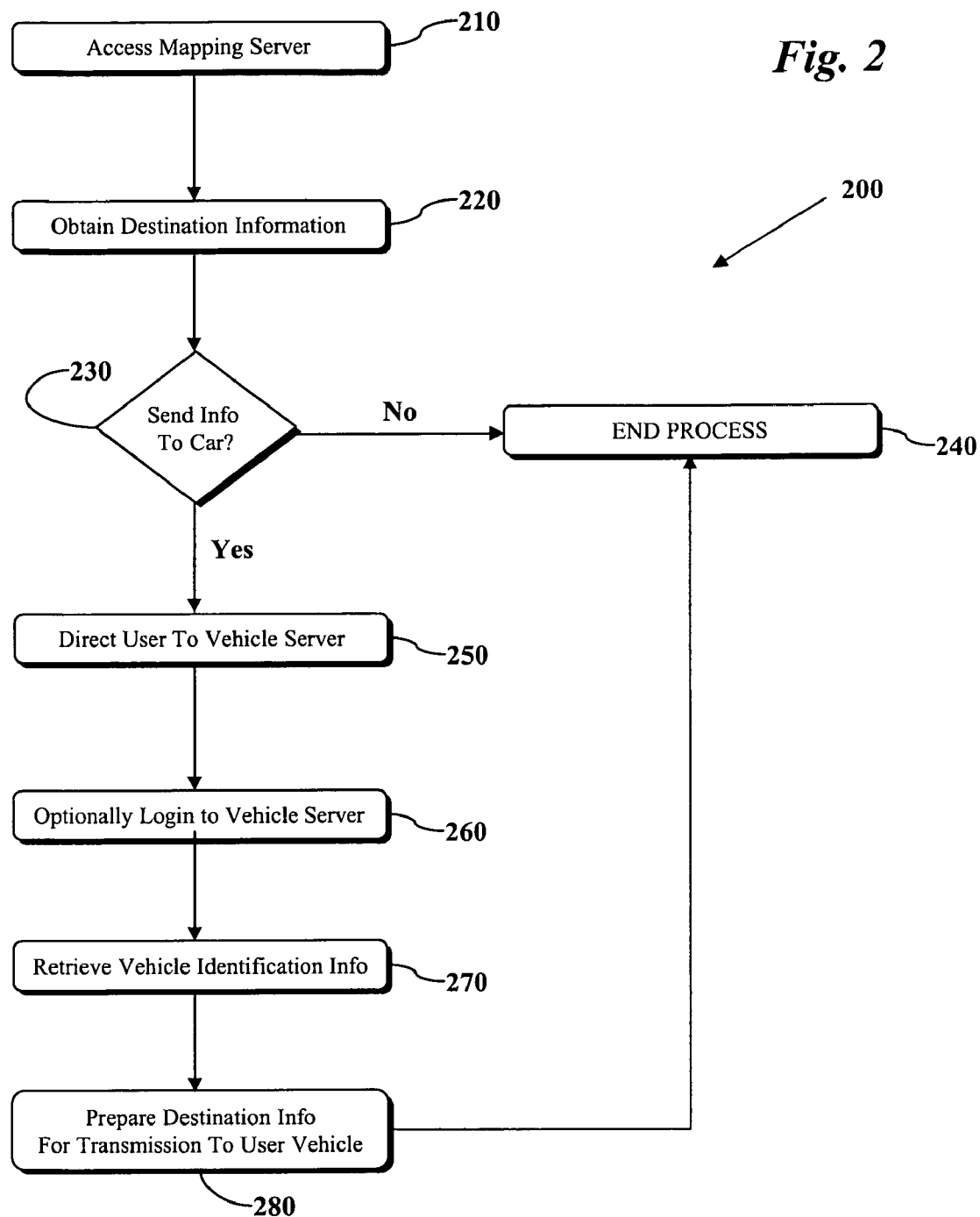
FIG. 2 depicts one embodiment of a process for carrying out one or more aspects of the invention.

Referring now to FIG. 2, depicted is one embodiment of a process for implementing the invention. In particular, process 200 begins with a user accessing a mapping server (e.g., mapping server 120) at block 210. In one embodiment, this may be accomplished by having the user enter a uniform resource locator (URL) into a browser application executing on the user's computer (e.g., user computer 110), where the URL corresponds to a webpage of the mapping server. By way of providing non-limiting examples, the accessed mapping server may correspond to the online mapping services of Google™ Maps, Yahoo™ Maps, GoYellow.de, etc. Once the user has accessed the mapping server, process 200 may proceed to block 220 where the user obtains destination information for a desired destination.

In one embodiment, starting and destination street addresses may be entered by the user. Based on this information, the mapping server may then provide the user with a set of turn-by-turn directions in the form of text and/or graphics. In another embodiment, the user may not know the destination street address ahead of time. In this case, it may be necessary for the user to perform an online address lookup using one of the many available online services. In this case, the mapping server is an online address lookup server which provides address information based on category and/or name user inputs.

Regardless of whether the mapping server is an online mapping service server or an address lookup server, at block 220 the user is provided with some form of a search result via a graphical user interface (GUI) of the mapping server which includes destination information, such as a street address.

As previously mentioned, one aspect of the invention is to provide the user with a selectable option to have this destination information automatically sent to a particular vehicle. In one embodiment, this option may be presented to the user in the form of a link or other selectable graphic button displayed along with the destination address/information. It should of course be appreciated that the selectable option can be in any form and should not be limited to a link, button, or any other particular embodiment. Moreover, the location of the selectable option may similarly vary. In other embodiments, information from past lookups/addresses may be stored in the vehicle such that the user can access recent searches without having to send the addresses to the vehicle. Furthermore, this information may be useful to speech recognition systems (in contrast to turn-knob or touch-screen systems) as it would tend to improve their reliability by defining greater probability to already found addresses.

Process 200 continues to block 230 where a determination is made as to whether the user has opted to send the obtained destination information to their vehicle. As described above, this determination may be based on the user selection of a link or button on a GUI of the mapping server. If the determination of block 230 indicates that the user has not selected to have the information automatically sent to his vehicle, process 200 ends at block 240. If, on the other hand, the user has elected to send the destination information to the user's vehicle, process 200 may continue to block 250 where the user is directed to a vehicle server (e.g., vehicle server 150). In one embodiment, the operation of block 250 involves re-directing a browser application executing on the user's computer to a network resource, such as a login page, of the vehicle server. In another embodiment, the mapping server may also pass the destination information to the vehicle server via a network connection (e.g., network 130). In still another embodiment, clicking/selecting the option to automatically send the destination information to the user's vehicle may include calling a function on the vehicle server and passing information to it, such as GPS coordinates, destination name, street address information, destination phone number, etc.

As previously discussed, the vehicle server may be operated and maintained by a manufacturer of the user's vehicle. In another embodiment, the vehicle server may be a portal to a plurality of vehicle manufacturer's databases.

Once the user has accessed a GUI of the vehicle server, process 200 may continue to block 260 where the user optionally may be required to provide some login information (e.g., username, password, etc.). Using the provided login information, the vehicle server may then access user-specific vehicle information, such as the user's vehicle identification number (VIN), at block 270. In one embodiment, the vehicle server uses the retrieved vehicle information to identify the particular vehicle (i.e., the user's vehicle) to which the destination information should be sent.

Finally, at block 280, the vehicle server may prepare/format the destination information for transmission to the user vehicle. While it should be appreciated that the operation of block 280 may take on numerous forms, in one embodiment, the preparation process may include updating a specified webpage with the vehicle information and/or destination information. Alternatively, an SMS message containing the desired destination information may be generated and queued for delivery to the vehicle. Finally, this operation may involved embedding an External Functionality Interface (EFI) function in a Wireless Markup Language (WML) page. Regardless of the type of preparation and/or formatting applied to the destination information, process 200 will conclude at block 280 with the desired information ready to be transmitted to the vehicle.

Figure 3:
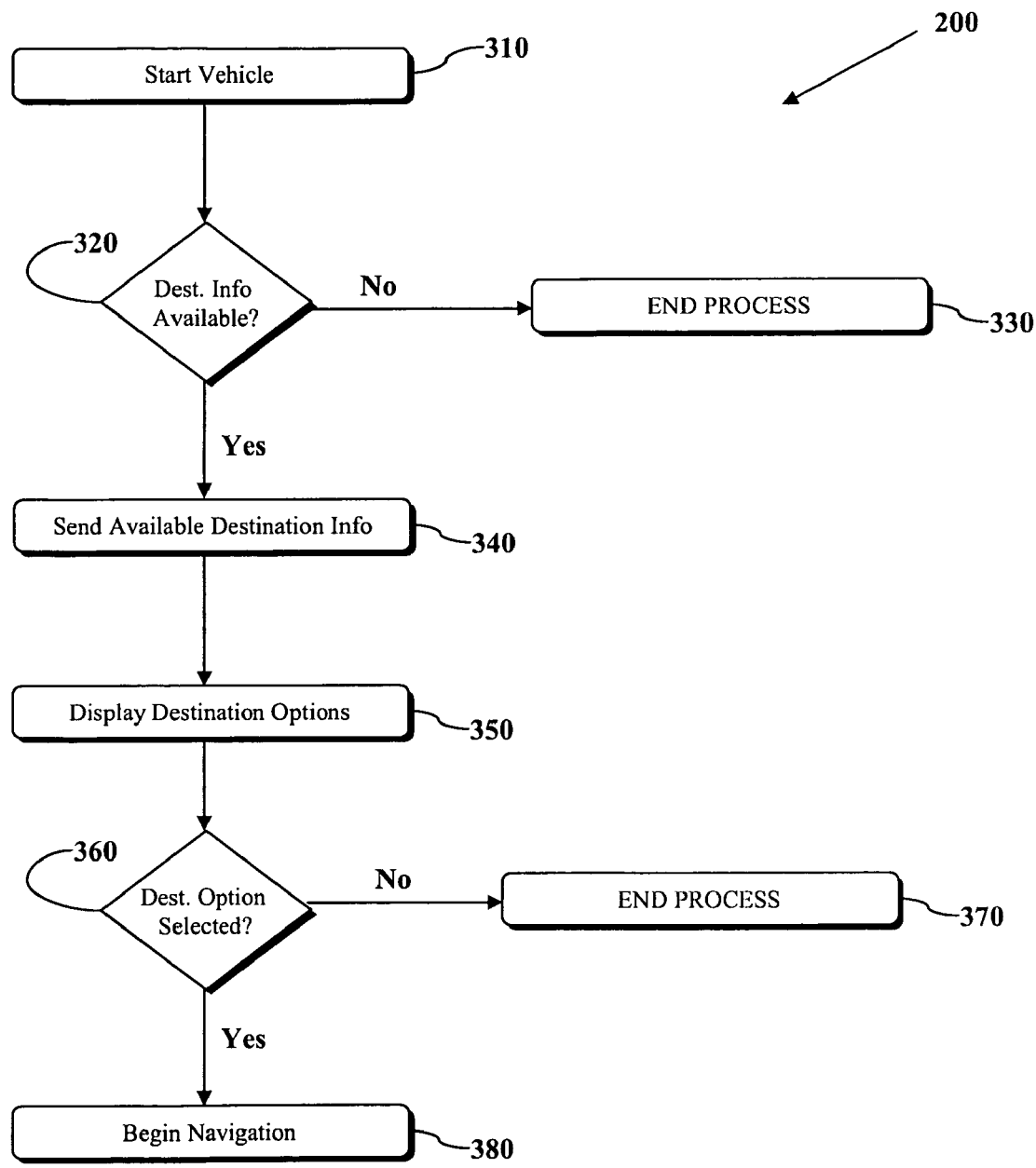
FIG. 3 depicts another embodiment of a process for carrying out one or more aspects of the invention.

Referring now to FIG. 3, depicted is one embodiment of a process 300 for automatically navigating a user to a desired location utilizing destination information generated using process 200 of FIG. 2. Process 300 begins at block 310 with the starting of the user's vehicle. At block 320, the vehicle makes a determination as to whether there is any available destination information generated by process 200. This determination may be made by having the vehicle make a query of the vehicle server (e.g., vehicle server 150) or some other specified online resource. For example, in one embodiment the query involves navigating to a specified webpage of the vehicle server using an onboard Internet browser of the vehicle. The specified webpage can then be checked by the vehicle to see if it contains destination information (e.g., generated from process 200) for the querying vehicle. In this embodiment, a special page may be displayed in the vehicle HMI offering to handoff the destination information to the navigation system.

Alternatively, the vehicle may query the server using an SMS message, whereby the vehicle server in turn sends a return SMS message to the vehicle containing the available destination information from process 200. Similarly, an onboard Internet browser may be used to detect an EFI link in a WML page sent to the vehicle or embedded in an SMS message. Finally, instead of an actual query, the vehicle may simply send a message or other indicator to the vehicle server that it is online and ready to receive any possible available destination information Continuing to refer to FIG. 3, if it is determined at block 320 that there is no available destination information, process 300 ends at block 330. However, if there is available destination information, process 300 will continue to block 340 where the available information is sent to the user's vehicle. The manner in which this information is provided can take numerous forms, including sending the data over the Internet (e.g., via network 130), via a direct link between the vehicle server and the vehicle, or via a separate cellular network 160. The vehicle server may use the vehicle's VIN or any other unique identifier to identify the particular vehicle to which the destination information should be sent.

In-vehicle navigation systems (e.g., In-vehicle navigation system 140) utilize HMIs of varying forms and sophistication levels. However, a common characteristic of all in-vehicle navigation system HMIs is the ability to display information to the vehicle's operator. To that end, the available destination information may be displayed to the user at block 350. This information may include multiple destinations from which the user may choose.

After the available destination information is displayed to the user, the user may select a particular destination to automatically populate a destination field of the in-vehicle navigation system. To that end, a determination is made at block 370 as to whether the user has selected to be guided to one of the available destinations. If not, the process simply ends at block 380. If so, on the other hand, the destination field of the vehicle's navigation system will be populated with the selected information and a navigation operation initiated thereafter.

It should further be appreciated that the available destination information may include a telephone number for a particular destination. In such cases, the user may be provided with a further option to automatically call the desired destination. This function may be performed in addition to, or in place of, the aforementioned automatic navigation function.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for vehicle navigation comprising the acts of:
   receiving, by a vehicle manufacturer server, destination information over a network from an online source in response to a user request to automatically send the destination information to a vehicle;
   receiving, by the vehicle manufacturer server, user identification information over the network;
   identifying said vehicle from a vehicle database of said vehicle manufacturer server based on the user identification information; and
   sending the destination information to an in-vehicle navigation system of the vehicle.

2. The method of claim 1, wherein sending the destination information comprising sending the destination information to the in-vehicle navigation system over a secure vehicle manufacturer connection.

3. The method of claim 1, wherein said destination information comprises at least one of a street address, GPS coordinates, telephone number and destination description.

4. The method of claim 3, where said street address comprises one or more of a street name, a street number, a city, a country and a zip code.

5. The method of claim 1, wherein receiving user identification information comprises:
   receiving login information over the network;
   authenticating the login information; and
   preparing, in response to said authenticating, the destination information for transmission to the in-vehicle navigation system.

6. The method of claim 1, further comprising retrieving a vehicle identification number based on said user identification information.

7. The method of claim 1, further comprising:
   displaying the destination information on a display of the vehicle;
   receiving a user selection of the destination information; and
   populating a destination field of an in-vehicle navigation system with the destination information based on the user selection.

8. The method of claim 1, wherein receiving destination information over a network from the online source comprises receiving the destination information from an Internet mapping service server.

9. The method of claim 1, wherein the user request is made via a graphical user interface of the online source over the network.

10. A system for vehicle navigation comprising:
    an in-vehicle navigation system in a vehicle coupled to a network;

a vehicle manufacture server in communication with the in-vehicle navigation system, the vehicle manufacture server configured to,
- receive destination information over a network from an online source in response to a user request to automatically send the destination information to the vehicle;
- receive user identification information over the network;
- identify said vehicle from a vehicle database of said vehicle manufacture server based on the user identification information; and
- send the destination information to the in-vehicle navigation system of the vehicle.

11. The system of claim 10, wherein the vehicle manufacturer server is further configured to send the destination information to the in-vehicle navigation system over a secure vehicle manufacturer connection.

12. The system of claim 10, wherein said destination information comprises at least one of a street address, GPS coordinates, telephone number and destination description.

13. The system of claim 12, where said street address comprises one or more of a street name, a street number, a city, a country and a zip code.

14. The system of claim 10, wherein the vehicle manufacturer server is further configured to,
- receive the user identification information in the form of login information over the network;
- authenticate the login information; and
- prepare the destination information for transmission to the vehicle in response to login information being authenticated.

15. The system of claim 10, wherein the vehicle manufacturer server is further configured to retrieve a vehicle identification number based on said user identification information.

16. The system of claim 10, wherein the in-vehicle navigation system is configured to,
- display the destination information on a display of the vehicle;
- receive a user selection of the destination information; and
- populate a destination field of the in-vehicle navigation system with the destination information based on the user selection.

17. The system of claim 10, wherein the online source is an Internet mapping service server.

18. The system of claim 10, wherein the user request is made via a graphical user interface of the online source over the network.

19. The method of claim 1, where the vehicle manufacturer server is maintained by a third party on behalf of a vehicle manufacturer of said vehicle.

20. The system of claim 10, where the vehicle manufacturer server is maintained by a third party on behalf of a vehicle manufacturer of said vehicle.

21. A system for vehicle navigation comprising:
- an in-vehicle navigation system in a vehicle;
- a vehicle manufacturer server having a secure connection with the in-vehicle navigation system, wherein the vehicle manufacturer server is configured to,
  - receive destination information over a network from an online mapping server in response to a user request to automatically send the destination information to the vehicle;
  - receive user identification information over the network;
  - identify a vehicle identification number (VIN) corresponding to said vehicle from a vehicle database of said vehicle server based on the user identification information; and
  - send the destination information to the in-vehicle navigation system of the vehicle as a secure vehicle manufacturer communication.

* * * * *